May 4, 1954   G. W. CORNELIUS   2,677,231
EXHAUST-CONSUMING DEVICE FOR INTERNAL-COMBUSTION ENGINES
Filed Feb. 20, 1950   3 Sheets-Sheet 1

INVENTOR.
George W. Cornelius
BY Stedman B. Hoar
Agent

May 4, 1954  G. W. CORNELIUS  2,677,231
EXHAUST-CONSUMING DEVICE FOR INTERNAL-COMBUSTION ENGINES
Filed Feb. 20, 1950  3 Sheets-Sheet 2

INVENTOR.
George W. Cornelius
BY Stedman B. Hoar
Agent

May 4, 1954          G. W. CORNELIUS          2,677,231
EXHAUST-CONSUMING DEVICE FOR INTERNAL-COMBUSTION ENGINES
Filed Feb. 20, 1950          3 Sheets-Sheet 3
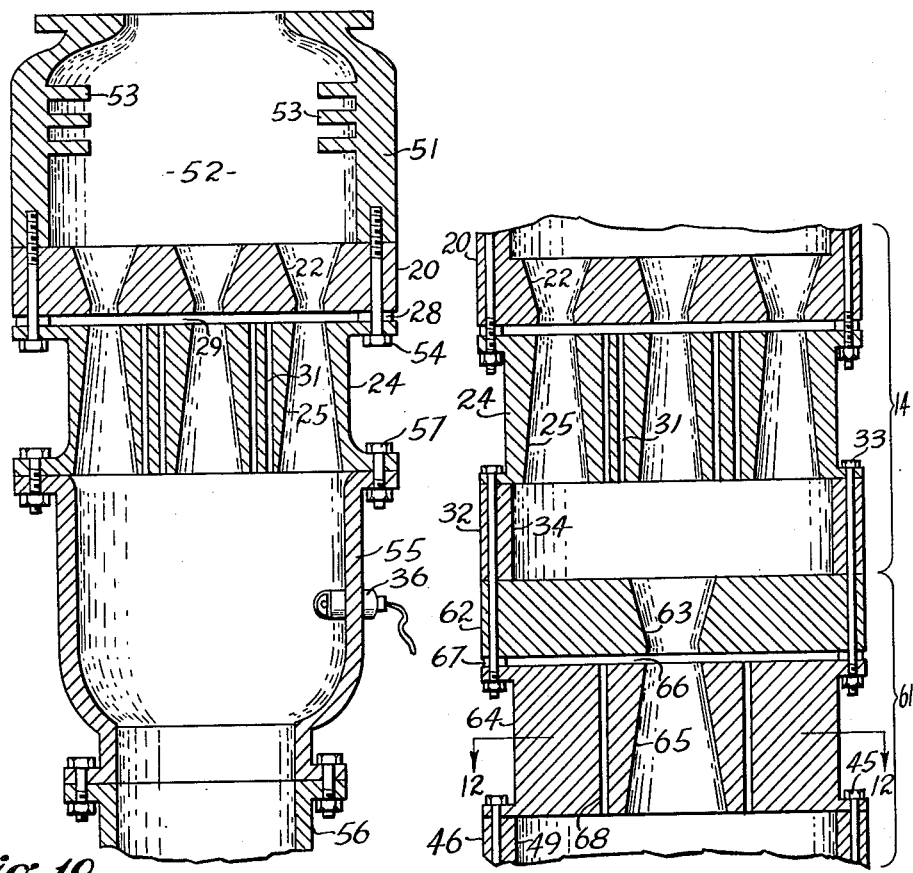
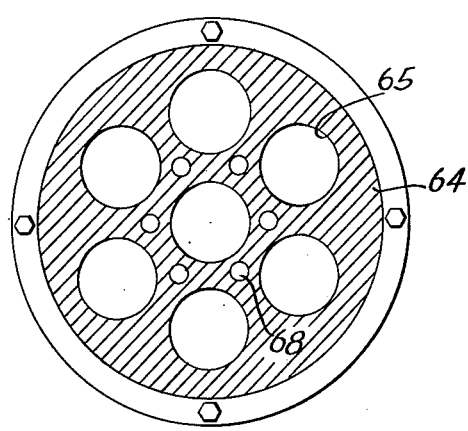
INVENTOR.
George W. Cornelius
BY Stedman B. Hoar
Agent Patented May 4, 1954

2,677,231

UNITED STATES PATENT OFFICE 2,677,231

EXHAUST-CONSUMING DEVICE FOR INTERNAL-COMBUSTION ENGINES

George W. Cornelius, Balboa, Calif., assignor of one-half to William L. Coop, Los Angeles, and one-fourth to Tina Vivian Cornelius, Newport Beach, Balboa, Calif.

Application February 20, 1950, Serial No. 145,298

4 Claims. (Cl. 60—30)

This invention relates to a device for controlling and consuming the exhaust gases of an internal combustion engine in order to render them innocuous and invisible.

In many cities and along major highways the exhaust gases of motor vehicles may be so concentrated that they not only befog the atmosphere but are deleterious to the health of persons breathing them. These gases are in part, as is well known, carbon monoxide, which under favorable conditions may be burned to the harmless gas, carbon dioxide. They also contain ungasified carbon or soot particles and various hydrocarbon constituents which have escaped combustion.

The problem of burning the combustible residue in the exhaust gases of a vehicle engine is complicated by the fact that neither the total quantity of gases nor the proportion of combustible material is anywhere near constant in service conditions. A vehicle rolling down a grade, another laboring up the grade, another stopped at a street intersection, and another accelerated in low gear to cross the intersection, present four different conditions. It is necessary that combustion apparatus inserted in the exhaust line be capable of accommodating the maximum volume of gases, increased in volume by thermal expansion and by admixture of air, with little, if any, increase in back-pressure, and yet be capable of operating efficiently under minimal conditions if for no other reason than to maintain temperature at a level suitable for a sudden change to greater volume.

It is an object of this invention to provide means for burning the combustible material residual in the exhaust of an internal combustion motor so as to reduce or even eliminate the noxious contents of the exhaust.

A further object of the invention is to provide a device for the purpose stated which may be easily and economically installed in the exhaust lines of either gasoline-propelled automobiles, or trucks and busses having diesel engines.

Still another object of the invention is to provide an exhaust-gas purifying device which may be installed in series of units appropriate to the nature of the vehicle and of the work to be done, a truck having a well-worn diesel engine, for example, receiving a greater number of units in series than a new automobile.

Yet another object of the invention is to provide a device for burning engine exhaust gases which will reduce the pulsations in the exhaust line of the engine and may, therefore, be substituted for the ordinary motor vehicle muffler, as performing the function of such a muffler in addition to its own specific function.

It is a further object of the invention to provide an exhaust gas burning device which has a high range of flexibility with respect to engine speeds, so as to be capable of efficient operation when the engine is idling as well as when the engine is running at full load or at high speed.

Broadly describing my invention, I accomplish the above objects by installing in the exhaust pipe of an internal combustion engine, generally in substitution for the conventional muffler, one or more units each comprising a plurality of Venturi-tubes arranged in parallel through which the exhaust gases pass, a plurality of such units being preferably arranged in series. The Venturi-tubes of each unit are arranged to draw fresh air from the atmosphere through appropriate apertures and conduits in a substantially heavy metal casing and to discharge into a combustion chamber also enclosed in the casing. Means are provided for igniting the air-gas mixture in the combustion chamber if it is not already heated to the point of spontaneous ignition, but the casing is so constructed as to carry the heat generated in the combustion chamber to the entering gas and air to bring them to a temperature at which combustion may be automatically maintained. The steady combustion in the combustion chamber, as contrasted to explosive combustion in the engine, and the dampening effects of the Venturi tubes, breaks up the normal exhaust pulsations and renders a separate muffler unnecessary, but the units may also be provided with entry or discharge chambers equipped with sound-deadening devices. Preferably, the units are composed of severable sub-units or casing members each representing a stage in the passage of the exhaust gases and the development of complete combustion, such as convergent-Venturi casing members, expanding Venturi casing members, and mixing or combustion chambers, all arranged to be bolted together so as to be readily replaceable and to afford variation of sizes and arrangement according to the needs of specific installations.

The invention possesses other useful features which will become apparent from the following detailed description of preferred and modified embodiments of my invention and from the accompanying drawings illustrative of these embodiments, in which.

Figure 1:
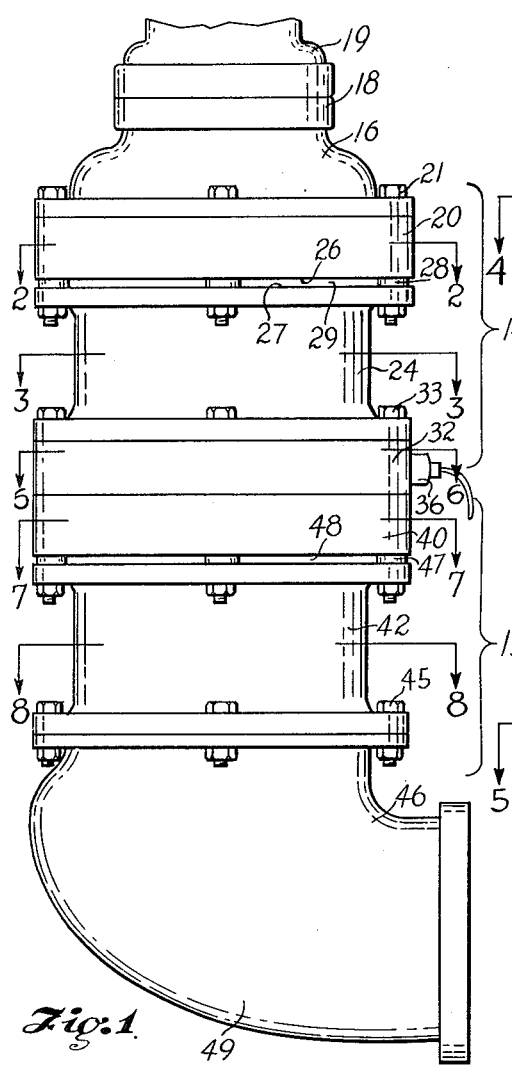
Figure 1 is a plan view of a preferred embodiment of my invention in which a plurality of Venturi-combustion units are combined in series.
Figure 2:
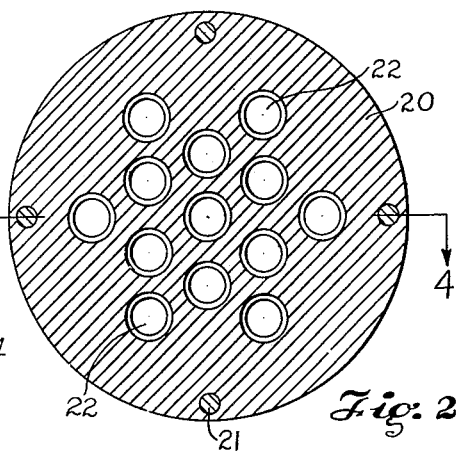
Figure 2 is a transverse sectional view taken on the plane of section 2—2 of Figure 1, showing an arrangement of the convergent Venturi sub-unit or casing member of the first unit.
Figure 3:
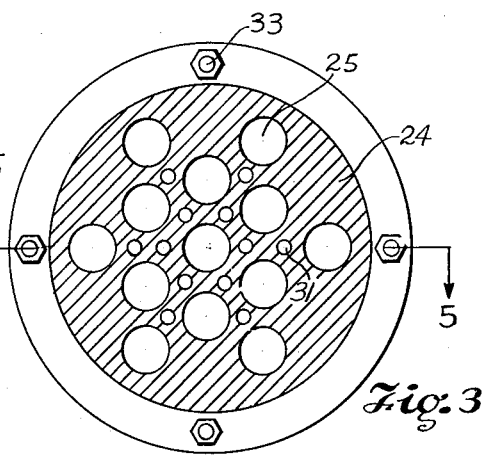
Figure 3 is a transverse sectional view taken on the plane of section 3—3 of Figure 1, showing an arrangement of the divergent Venturi member of the first unit.
Figure 4:
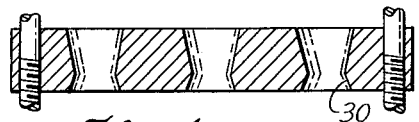
Figure 4 is a longitudinal sectional view through the convergent Venturi member of the first unit, taken on the plane of section 4—4 of Figure 2.
Figure 5:
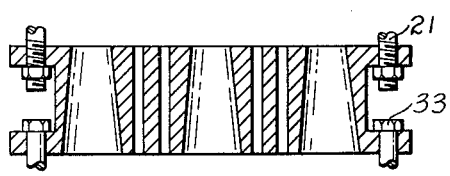
Figure 5 is a longitudinal sectional view through the divergent Venturi member of the first unit, taken on the plane of section 5—5 of Figure 3.
Figure 6:
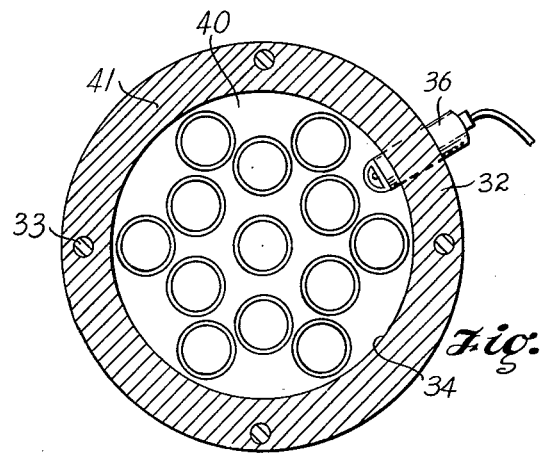
Figure 6 is a transverse sectional view taken on the plane of section 6—6 of Figure 1, showing the combustion chamber terminating the first unit and the beginning of the second unit.
Figure 7:
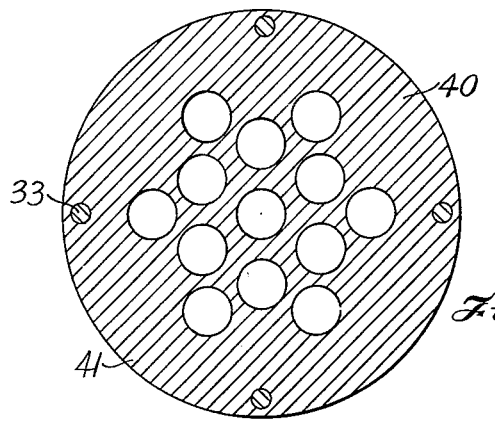
Figure 8:
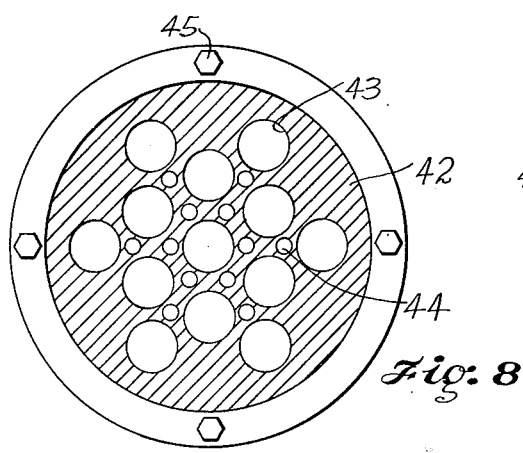
Figure 9:
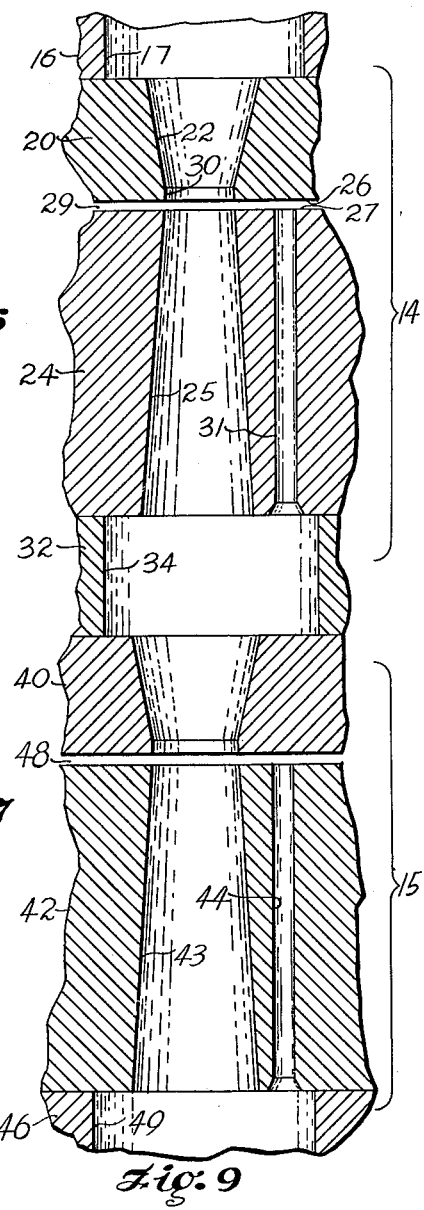

Figures 7 and 8 are transverse sectional views on the planes 7—7 and 8—8 of Figure 1, showing respectively the convergent Venturi and divergent Venturi members of the second unit, being similar to Figures 2 and 3 except for the dimensions of the passages shown;

Figure 9 is a schematic view generally representative of a longitudinal section of Figure 1, and on an enlarged scale, illustrative of the sequence and of representative, though not critical, relative proportions of the units shown in Figures 2 to 8;

Figure 10 is a longitudinal sectional view of a modified form of my invention in which a single Venturi-combustion unit is combined with a sound-dampening mixing chamber;

Figure 11 is a longitudinal sectional view of another modification of my invention, in which Venturi-combustion units of different types are combined in a series, the first having a large number of relatively small Venturi tubes and the second having a smaller number of larger tubes; and Figure 12 is a transverse sectional view on the plane of section 12—12 of Figure 11, illustrative of an arrangement of the above-mentioned second Venturi-combustion unit.

Having reference now to the details of the drawings, my improved device for consuming exhaust gases may take the form shown generally in Figure 1 and in greater detail in Figures 2 or 9 in which Venturi-combustion units 14 and 15 are combined in series. The unit 14 has an entrance member 16, usually in the form of an expanding pipe and containing an entrance chamber 17 connected by a suitable adapter 18 to the exhaust pipe 19 of an engine (not shown). A plate or circular block 20 is secured to the entrance member 16 by bolts 21. The block 20 may be termed a convergent Venturi sub-unit, as it is perforated by frusto-conical holes 22 which are of decreasing diameter in the direction of flow for the greater part of their length. Secured to the convergent Venturi sub-unit 20, also by the bolts 21 is another block 24, which I term the divergent Venturi sub-unit, as it is perforated by frusto-conical holes 25 which are of increasing diameter in the direction of flow throughout their length. The adjacent faces 26 and 27 of the sub-units 20 and 24 are held spaced apart by washers 28 carried by the bolts 21 to provide a narrow-air-passage 29 communicating with the atmosphere and with the holes in the sub-units 20 and 24. The holes 22 in the sub-unit 20 preferably attain their least diameter shortly before reaching the face 26, and thereafter expand slightly as shown at 30. The holes 25 are aligned with the holes 22 and their entrances in the face 27 are of such size that their wall surfaces may and do lie in continuation of the frusto-conical surface defined by the wall surfaces of the expanding portions 30 of the holes 22. I have found experimentally that very good results may be attained if the conical convergence of the holes 22 is of the order of 21°, and the conical divergence of the expanding portions 30 and holes 25 is about 7°, but these values are not to be taken as critical.

The divergent Venturi sub-unit 24 may also contain straight-sided holes 31, paralleling the holes 25 and interspersed among them and considerably smaller than the holes 25. These holes 31 will be found to be advantageous in installation on engines running largely at constant load. A sub-unit member 32, which may be simply a hollow cylinder, is attached to the sub-unit 24 by bolts 33 and its interior cavity 34 forms a combustion chamber into which the holes 25 and 31 admit. The sub-units 20, 24, and 32 are all of heat-conductive material and the attachment of the sub-unit 32 to the sub-unit 24 is intimate to permit conduction of heat generated by combustion in the chamber 34. It will be observed from Figure 3 that the wall-material of the sub-unit 24, residual after the holes 25 and 31 have been formed therein, represents a large proportion of the cross-area of the sub-unit and is readily capable of transmitting heat from the combustion chamber 34 to the wall-surfaces of the holes 25 and 31 and to the face 27 adjacent the air-passage 29.

Considering the schematic view presented in Figure 9, it will be seen that the aligned frusto-conical holes 22 and 25 form Venturi tubes leading from the entrance chamber 17 to the combustion chamber 34. As is well known, the passage of gas along such Venturi tubes in the direction from chamber 17 to chamber 34 will develop a low-pressure zone at the point of greatest contraction, generally called the throat of a Venturi tube. The air-passage 29 admits air to the Venturi tubes substantially at the low pressure zone or throat, the air being drawn in between and heated by the sub-unit faces 26 and 27. A portion of the air so drawn in mixes with the exhaust gas in the divergent tubes 25; another portion of the air entering the air-passage 29 is diverted to the relatively narrow holes 31 if these be present and thence to the combustion chamber 34 where it mixes with the mixture entering from the holes 25. When combustion takes place in the chamber 34, the walls of the holes 25 and 31 are highly heated and the gases and air traversing these passages enter the combustion chamber at temperatures at which the atmospheric oxygen and gaseous hydrocarbons readily unite in combustion.

To assist combustion to be started and maintained in the chamber 34 under conditions of low motor load, when both the volume and temperature of the gas are below average, I preferably mount an electric igniter 36 in the wall of the sub-unit 32, the filament of the plug being within the chamber 34. The igniter 36 may be operated on steady current, without make-and-break, as steady combustion is desired rather than timed explosions. The igniter may therefore be of the type known as a glow-plug, or alternatively may be a spark-plug if a more intensive igniting heat is desired. The igniter will ordinarily be required only under sub-normal engine load conditions, and the current to the igniter may be controlled by a switch, not shown, in turn responsive to means related to the volume of fuel being fed to the engine. The switch may, for example, be controlled by the position of the fuel throttle, or by the pressure in the engine intake manifold, and it is believed that such installations lie well within the skill of automotive mechanics and need not be described in detail, being accessory and optional.

In the preferred form of my invention shown in Figures 1 to 9, the Venturi-combustion unit 14, above described, is followed by the similar unit 15, for which the combustion chamber 34 serves as entrance chamber. The bolts 33 hold a convergent Venturi sub-unit 40 and a divergent Venturi sub-unit 42 to the combustion sub-unit 32, and bolts 45 hold a combustion chamber sub-unit 46 to the sub-unit 42. Frusto-conical holes 41 and 43 in the sub-units 40 and 42 respectively are similar to the frusto-conical holes 22 and 25 with the exception that they are of greater cross-sectional area in order to accommodate the original entering gases and air added thereto, now further expanded by combustion. I have found experimentally that the increase in cross-sectional area of the holes 41 and 43 over the corresponding holes 22 and 25, is preferably of the order of 1.4 to 1. Auxiliary air-inlet holes 44 in the sub-unit 42 may be of the same order of size as the holes 31 in the sub-unit 24, to which they correspond in function. Washers 47 hold the sub-units 40 and 42 spaced apart to provide the air-passage 48 communicating with the zone of low pressure of the Venturi-tubes which the holes 41 and 43 form, and with the auxiliary holes 44. It will generally not be necessary to install an electric igniter in the combustion chamber 49 of the sub-unit 46, as flame generated in the Venturi-combustion unit 14 will normally carry into the Venturi-combustion unit 15 in sufficient intensity to assure ignition.

In the modification of my invention illustrated in Figure 10, a single Venturi-combustion unit is combined with an entrance chamber having also the character and function of a muffler to dampen the pulsations of the engine exhaust. This may be desirable when only one Venturi-combustion unit is used, although under many operating conditions a single Venturi-combustion unit is an effective muffler by itself; when two such units are installed in series, it will be found that the substantially steady combustion generated in the first combustion chamber 34, followed by passage of the gases and admixed air through the second Venturi-combustion unit 15, dampens the engine pulsations to a degree at which they are not objectionable.

To combine a combustion-Venturi unit with a muffler, a member 51 may be provided, having a relatively large interior chamber 52 upon the interior wall surface of which are a plurality of annular flanges 53. As illustrated in Figure 10, the member 51 is substituted for the entrance chamber member 16, and is connected to the convergent Venturi sub-unit 20 by bolts 54. A combustion chamber unit 55, contracted at its outlet, if desired, to receive an adapter 56, is secured to the sub-unit 24 by bolts 57. However, it is obvious that the interchangeability of the sub-units will permit the member 51 to be substituted for the unit 55 and to serve as a combustion chamber instead of as an entrance chamber sub-unit. In that case, a standard entrance chamber sub-unit 16 may be used at the entrance end of the unit. In the arrangement illustrated, the flanges 53 serve to mix the entering jets of exhaust gas and to cause the gas to enter the holes 22 in a more constant flow. In either arrangement, the flanges serve, as in the ordinary muffler, to dampen the engine pulsations, but these pulsations are additionally dampened by the abrupt change in the cross-sectional passage area at the interface between the muffler chamber and the Venturi tubes and by the relatively constant sound level developed by combustion of the ignited gases. In consequence, the member 51 may be much shorter and simpler than a conventional muffler, the entire unit, in fact, occupying no greater space in the engine exhaust system than is usually occupied by a muffler.

In a dual-unit installation such as first described, it is not necessary that the two units in series have equal numbers of Venturi tubes in parallel because the intervening combustion chamber acts as a mixing and entrance chamber for the second unit. I have illustrated in Figure 11 and 12 a possible modification of my invention, having two Venturi-combustion units in series, but with differing numbers of Venturi tubes in the two units. For purposes of illustration I have shown the Venturi-combustion unit 14, previously described, in series with a Venturi-combustion unit 61 similar in all respects except that it has a lesser number of Venturi-tubes. A convergent Venturi sub-unit 62, having for example seven fruso-conical holes 63, instead of the thirteen holes 22 shown in the sub-unit 20 in Figure 2, is secured to the combustion chamber sub-unit 32 and feeds to a divergent Venturi sub-unit 64 which will also have seven frusto-conical holes 65 aligned with the holes 63 to form seven Venturi tubes. An air-gap 66 between the sub-units 62 and 64 is provided by washers 67. The holes 63, and of course also the holes 65, will be considerably larger than the holes 22 and 25, following the principle that the combined mean cross-sectional area of the Venturi tubes in a succeeding unit of a series should be of the order of 1.4 times the like area of the preceding unit. The auxiliary air holes 68, if present in less number than the holes 31, will likewise be increased in individual size to provide a like total capacity. The combustion chamber sub-unit terminating the unit 61 may have any suitable form, as the sub-units 46 and 55 hitherto described. The sequential order of the units 14 and 61 may be reversed.

It is believed that the manner of operation of my invention in both its preferred and modified forms will be obvious to those skilled in the art, in view of the explanation of the functions of the various sub-units recited in connection with the preferred embodiment of the invention.

It will be seen that my invention possesses the characteristic of great flexibility in the manner of its installation, and is therefore suitable for a wide range of operating conditions. Not only are there various possible combinations of units in series, but individual sub-units may be transposed, such as substituting the sub-unit 51 for either of the sub-units 16 or 46 in the embodiment of my invention shown in Figure 1. Each installation may therefore be tailored to the particular vehicle and engine with which it is to be used, having regard to the age and condition of the engine, and the nature of the fuel. Units and sub-units may be stocked, having connecting flanges and bolts of uniform size and design, but varying in the size and number of Venturi tubes which they form and in the style of their entrance and combustion chambers. Obviously, therefore, the scope of my invention is not to be interpreted strictly in the light of the examples herein described and illustrated, but should be held inclusive of such arrangements and constructions as fall within the scope and spirit of the appended claims.

I claim:

1. A gas consuming device for an internal combustion engine comprising; two groups of separable exhaust conducting sections forming a casing mountable in the exhaust pipe of the engine, each group including a member having a plurality of parallel elongated gas passages of decreasing cross-sectional area, a member having a plurality of elongated gas passages of increasing cross-sectional area alined with the gas passage of said first named member, means spacing said members to provide a narrow air gap between their adjacent faces extending the entire distance across the members and communicating with the atmosphere, and a member between the two groups, said member having a passage therethrough of an area large enough to receive therein exhaust gases from the passages of said first named group and to form an exhaust gas combustion chamber communicating with the passages of said second section.

2. A gas consuming device for an internal combustion engine comprising; two groups of separable exhaust conducting sections forming a casing mountable in the exhaust pipe of the engine, each group including a member having a plurality of parallel elongated gas passages of decreasing cross-sectional area, a member having a plurality of elongated gas passages of increasing cross-sectional area alined with the gas passages of said first named member, said second member having a plurality of cylindrical passages therethrough parallel with the other passages thereof, means spacing said members apart to provide a narrow air gap between their adjacent faces extending the entire distance across the members and communicating with the atmosphere, and a member between the two groups, said member having a passage therethrough of an area large enough to receive therein exhaust gases from the passages of said first named group and to form an exhaust gas combustion chamber communicating with the passages of said second section.

3. A gas consuming device for an internal combustion engine comprising; two groups of separable exhaust conducting sections forming a casing mountable in the exhaust pipe of the engine, each group including a member having a plurality of parallel elongated gas passages of decreasing cross-sectional area, a member having a plurality of elongated gas passages of increasing cross-sectional area alined with the gas passages of said first named member, the passages through the second member of each group being of greater combined cross-sectional area than the passages through the first member, means spacing said members to provide a narrow air gap between their adjacent faces extending the entire distance across the members and communicating with the atmosphere, and a member between the two groups, said member having a passage therethrough of an area large enough to receive therein exhaust gases from the passages of said first named group and to form an exhaust gas combustion chamber communicating with the passages of said second section.

4. A gas consuming device for an internal combustion engine comprising; two groups of separable exhaust conducting sections forming a casing mountable in the exhaust pipe of the engine, each group including a member having a plurality of parallel elongated gas passages of decreasing cross-sectional area, a member having a plurality of elongated gas passages of increasing cross-sectional area alined with the gas passages of said first named member, said second member having a plurality of cylindrical passages therethrough parallel with the other passages thereof, the passages through the second member of each group being of greater combined cross-sectional area, than the passages through the first member, means spacing said members apart to provide a narrow air gap between their adjacent faces extending the entire distance across the members and communicating with the atmosphere, and a member between the two groups, said member having a passage therethrough of an area large enough to receive therein exhaust gases from the passages of said first named group and to form an exhaust gas combustion chamber communicating with the passages of said second section.

References Cited in the file of this patent

UNITED STATES PATENTS

| Number | Name | Date |
| --- | --- | --- |
| 2,005,249 | Tietig | June 18, 1935 |

FOREIGN PATENTS

| Number | Country | Date |
| --- | --- | --- |
| 512,991 | Germany | Nov. 22, 1930 |
| 336,714 | Great Britain | Oct. 23, 1930 |
| 552,142 | France | Jan. 17, 1923 |
| 607,998 | France | Apr. 10, 1926 |